United States Patent [19]
Shen et al.

[11] Patent Number: 5,572,525
[45] Date of Patent: Nov. 5, 1996

[54] GPIB EXTENDER WITH FIND LISTENER PROTOCOL CAPABILITIES

[75] Inventors: Tian Shen; Andrew C. Thomson, both of Austin, Tex.

[73] Assignee: National Instruments Corporation, Austin, Tex.

[21] Appl. No.: 455,507

[22] Filed: May 31, 1995

[51] Int. Cl.$^6$ ................................................. H04L 12/40
[52] U.S. Cl. .................... 370/85.1; 370/85.13; 370/85.9; 370/112; 371/32; 371/22.1; 364/244; 364/232.8; 364/262.4; 395/800
[58] Field of Search .................... 370/85.1, 112, 370/85.13, 85.9; 371/32; 364/244, 232.8, 262.4, 240, 580, 247; 395/800, 164, 375, 500

[56] References Cited

U.S. PATENT DOCUMENTS

| 4,451,886 | 5/1984 | Guest et al. | 364/200 |
| 4,817,101 | 3/1989 | Wyeth et al. | 372/32 |
| 4,959,833 | 9/1990 | Mercola et al. | 371/32 |
| 5,287,528 | 2/1994 | Canik et al. | 395/800 |
| 5,315,706 | 5/1994 | Thomson et al. | 395/285 |

OTHER PUBLICATIONS

Guest, David H., "An HP–1B Extender for Distributed Instrument Systems," Hewlett–Packard Journal, Aug. 1979, pp. 26–32.
Leibson, Steve "What are RS–232C and IEEE 488?," Instruments and Control Systems, Jan. 1980, pp. 47–53.

Primary Examiner—Melvin Marcelo
Assistant Examiner—Melissa Kay Carman
Attorney, Agent, or Firm—Jeffrey C. Hood

[57] ABSTRACT

A GPIB bus extender which intelligently supports the IEEE 488.2 find listeners protocol. The GPIB bus extender of the present invention monitors the bus and determines when a talker is present on the bus. When the GPIB extender detects a talker present on the bus, the extender configures itself as a listener to receive any messages for devices on the remote bus. When the GPIB extender does not detect a talker present on the bus, the extender does not configure itself as a listener, but rather is prepared to participate in a find listener protocol.

33 Claims, 6 Drawing Sheets

LACS = 1tn = LTN0 + LTN2 + LTN3

GPIB EXTENDER WITH FIND LISTENER PROTOCOL CAPABILITIES

FIELD OF THE INVENTION

The present invention relates to a GPIB bus extender which intelligently determines when a talker is being addressed on the bus and configures itself either as a listener or remains available to participate in a find listeners protocol.

DESCRIPTION OF THE RELATED ART

The IEEE 488 bus, also referred to as the General Purpose Instrumentation Bus (GPIB), is used for connecting instruments and controllers to a common bus to perform various test and measurement functions. A typical GPIB system comprises one or more GPIB instruments, up to 14 instruments, and a controller, typically a GPIB interface board installed in a general purpose computer, connected by standard GPIB cables. The controller provides program commands to the instruments and the instruments return formatted data and response messages to the controller. GPIB instruments are message-based devices which are programed with high-level ASCII character strings. A respective GPIB device includes a local processor that parses the command strings and sets the appropriate register bits to perform the indicated functions.

The original ANSI IEEE 488 standard, now referred to as IEEE 488.1, was introduced in 1975 and greatly simplified the interconnection of programmable instruments by clearly defining mechanical, electrical and hardware protocol specifications. This enabled users to connect instruments from different manufacturers to a standard cable, thus allowing the instruments to communicate with each other. The original IEEE 488.1 standard dramatically improved the productivity of test engineers. However, this original standard included a number of limitations. More specifically, the IEEE 488.1 standard did not specify data formats, status reporting guidelines, a message exchange protocol, configuration commands, or a minimum set of device commands. As a result, different manufacturers implemented each item differently, resulting in integration problems for the test system developer.

In 1987, a new IEEE 488 standard for programmable instruments and devices was approved which strengthened the original IEEE 488.1 standard by precisely defining how controllers and instruments communicated with each other. The IEEE 488.2 standard kept the IEEE 488.1 standard completely intact while also defining standard data codes and formats, a status reporting model, a message exchange protocol, a set of common commands for all instruments, and controller requirements, therefore making systems more compatible and simplifying program development. In general, the IEEE 488.2 standard focuses on software protocol issues while the IEEE 488.1 standard is primarily hardware oriented.

The IEEE 488.2 specification added a new protocol referred to as the "find listeners" protocol. When operations first begin in a GPIB system, the controller can use the find listeners protocol to scan the system and determine what GPIB devices exist in the system and their respective addresses. For example, the controller could determine that GPIB devices existed at addresses 1, 3, 5, and 6. The controller can then use this information to determine if any of the devices are 488.2 devices and if so can read the respective identification information. Thus, in this example, the controller can use the find listeners protocol to determine that a 488.1 listener device exists at address 1, a Fluke multimeter serial number 4609 (listener) exists at address 3, a Tektronix TDS450 oscilloscope (talker/listener) exists at address 5, etc.

The IEEE 488 standard has restrictions on cable length and device loading. More specifically, the standard specifies that the total cable length for a GPIB system cannot exceed 20 meters and that the maximum number of devices that can be connected to the bus is 15. However, many times a user or developer desires to locate one or more instruments and/or a controller at a remote site or at a location which exceeds 20 meters from the other devices. In addition, many times a user desires to connect a greater number of devices to a common GPIB bus for certain test and measurement applications.

GPIB bus extenders are used to extend the maximum permissible distance between instrument devices and/or controllers. GPIB bus extenders/expanders are also used to enable more than 15 devices to connect to a common GPIB bus. GPIB bus extenders allow a user to place one or more instruments and/or controllers in a location remote from other instruments or controllers where it is desired that all of these instruments and controllers couple to a common GPIB bus. Examples of the use of a GPIB extender include controlling a remote printer or plotter as if the respective output device was in the same room as the various instruments, isolating devices located in noisy or hazardous environments, controlling factory floor tests from a remote office, or interfacing a large number of devices on a single logical GPIB system.

A GPIB system generally operates as follows. First, a controller asserts the ATN (attention) line on the bus and addresses a respective device to "talk" and addresses one or more devices to "listen." The controller then deasserts the ATN line and the transfer begins between the talker and the one or more listeners. After this transfer has completed, the controller again asserts the ATN line, readdresses new talkers and listeners, deasserts attention, and another transfer operates.

One problem that arises when extenders are used in a GPIB system is that, after the extenders detect the addressing information from the controller, the extenders do not know where the talker and/or listeners are located. For example, the talker could be on the local bus relative to the respective extender or could be on a remote bus relative to the extender. Likewise, the one or more listeners could be on the local or remote bus. Talkers generally determine if there is any listener on the bus before they provide data out on the bus. If the talker determines that there is no listener on the bus, then the talker will not source data onto the bus, but rather will generate an error.

Thus, prior art extenders are required to appear as listeners when there is a talker in the system. In this manner, since the respective extenders do not know where the talker or listeners are located, both extenders are required to appear as listeners when a talker is performing operations in the system. In other words, the talker could be situated on the local or remote bus relative to the respective extender, and since the listeners could be situated on a remote bus relative to the talker, each extender must behave as a listener to model or represent possible listeners on the remote side.

One problem thin arises is that, if a controller is perforating a find listeners protocol, and if both extenders appear as listeners on the bus, the controller will erroneously determine that every device on the remote bus is a listener.

Thus the find listener protocol will not work with current GPIB extenders. Therefore, an improved GPIB extender and method is desired which operates properly and transparently in a GPIB system while also supporting the IEEE 488.2 find listener protocol.

SUMMARY OF THE INVENTION

The present invention comprises a GPIB bus extender which intelligently supports the IEEE 488.2 find listener protocol. The GPIB bus extender of the present invention monitors the bus and determines when a talker is present on the bus. When the GPIB extender detects a talker present on the bus, the extender configures itself as a listener to receive any messages for devices on the remote bus. When the GPIB extender does not detect a talker present on the bus, the extender does not configure itself as a listener, but rather is prepared to participate in a find listener protocol.

A GPIB system includes according to the present invention two or more GPIB bus extenders and zero or more GPIB devices coupled to each extender. For example, zero or more instruments and/or zero or more controllers are coupled to a first GPIB bus. A first GPIB bus extender according to the present invention is also coupled to this GPIB bus. The GPIB bus extender connects to a second GPIB bus extender in a remote location. In the preferred embodiment, the GPIB bus extenders connect with each other through a fiber optic cable. The second or remote GPIB bus extender couples to a GPIB bus which also includes one or more instruments and/or controllers as desired. A pair of GPIB bus extenders according to the present invention can extend the cable length to up to one kilometer without compromising the integrity of the GPIB bus or requiring any modifications to application programs. In addition, the GPIB bus extenders of the present invention allow a user to expand the GPIB bus to up to 26 devices, i.e., 13 devices can be attached to each extender.

Each GPIB bus extender in the system includes find listener protocol capabilities according to the present invention. At power-on, each extender powers up in a default configuration as a listener. Thus, each extender initially presumes at power up that a talker is present on the bus. This allows the extenders to operate properly in a system including a single talk-only device and one or more listen-only devices, i.e., a system which does not include a controller.

When a controller is present in the system, and the controller addresses a device to talk, each extender interprets the talker address message and determines if a talker is present on the bus. If so, then each extender configures itself as a listener to represent potential listeners on the remote side. If the extenders determine that a talker is not present on the bus, then a find listener protocol may be forthcoming, and the extenders initially do not configure themselves as listeners. In this event, each extender waits until a listener responds to the find listener protocol and broadcasts the message to the controller.

The GPIB extender of the present invention includes message interpreter layer logic which couples directly to the GPIB bus. The message interpreter layer logic includes an IEEE 488 interface function block comprising state machine logic circuitry for implementing the functions of a GPIB interface. This interface function block also includes logic for detecting talkers on the bus and participating in a find listener protocol. The IEEE 488 interface function block provides state variables to a bus translator. The bus translator also couples to the GPIB bus and uses the state variables from the interface function block to generate local messages and data to the remote GPIB extender, i.e., the other GPIB extender in the system. The bus translator provides data to a first in first out (FIFO) buffer and data is provided from the FIFO buffer to the remote extender. The FIFO buffer also receives data from the remote extender and provides the data directly to the interface function block, which in turn provides the data to the GPIB bus.

Therefore, the GPIB extender according to the present invention intelligently determines if there is a talker on the bus, and then configures itself as a listener or as a participant in the find listener protocol appropriately. When the controller on the bus addresses a device to talk, and provides a talker address message to the device, the extender interprets this talker address message, determines that there is a talker on the bus and configures itself as a listener. However, if the GPIB extender of the present invention does not detect a talker, then the GPIB extender does not configure itself as a listener. In this case, it is possible that a find listener protocol subsequently be performed. In this case, the extender does not assert handshake lines and inform the controller that it is a listener. Rather, the extender waits until a listener responds to a find listener protocol and broadcasts the appropriate message to the controller.

Therefore, the GPIB extender of the present invention intelligently determines if a talker is present on the bus to differentiate between normal GPIB operations and a find listener protocol being performed by the controller. If a talker exists on the bus, the GPIB extender appears as a listener in case one or more listeners exists on the remote bus. If a talker is not detected, then a possible find listener protocol may subsequently be performed. In this case, the extender does not configure itself as a listener. Therefore the GPIB bus extender of the present invention allows a controller to perform a find listener protocol in the GPIB system. The GPIB extender also operates properly in a system which does not include a controller, i.e., includes a talk-only device and one or more listen-only devices.

BRIEF DESCRIPTION OF THE DRAWINGS

A better understanding of the present invention can be obtained when the following detailed description of the preferred embodiment is considered in conjunction with the following drawings, in which:

FIG. 6, comprising

DETAILED DESCRIPTION OF THE PREFERRED EMBODIMENT

Incorporation By Reference

The IEEE 488.1 specification and the IEEE 488.2 specification published by the IEEE are both hereby incorporated by reference in their entirety.

GPIB System Block Diagram.

Figure 1:
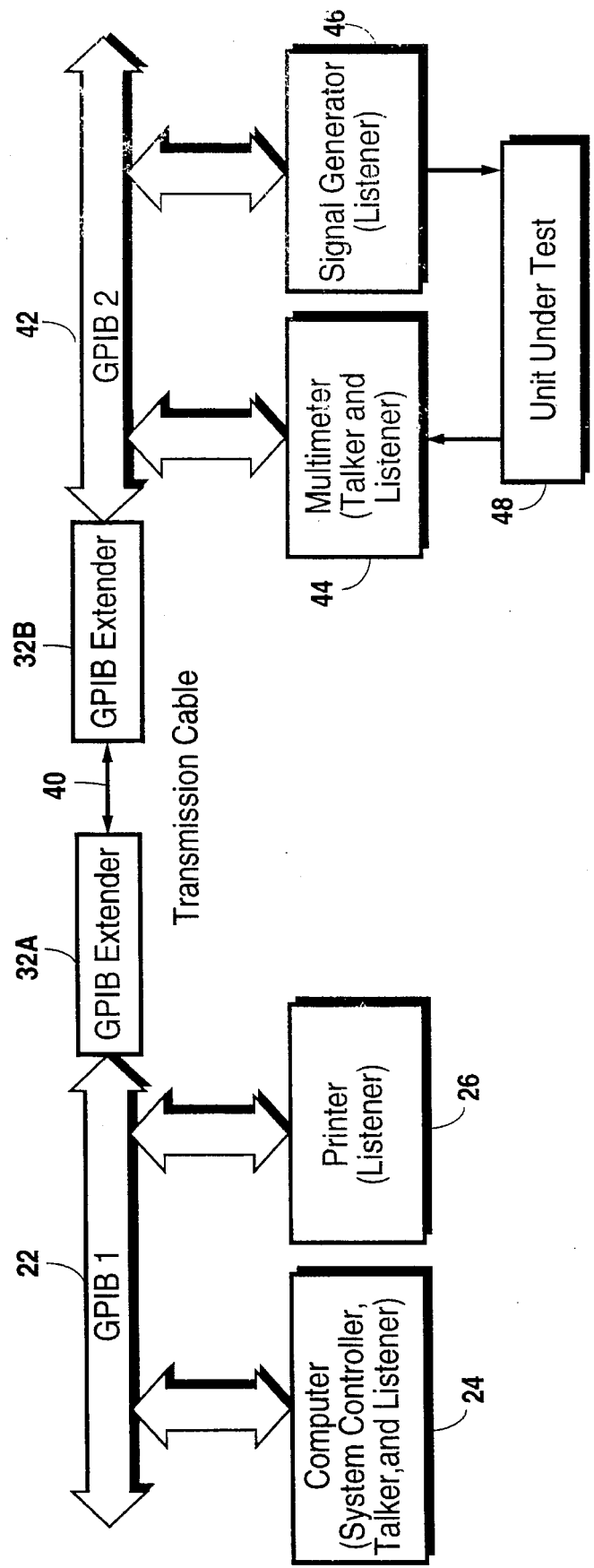
FIG. 1 is a block diagram illustrating a GPIB system using two GPIB bus extenders according to the present invention.

Referring now to FIG. 1, a block diagram of a GPIB system is shown including two GPIB bus extenders 32A and 32B according to the present invention. As shown, the GPIB system includes one or more devices coupled to a first GPIB bus 22. Any of various devices may be coupled to the first GPIB bus 22 including one or more instruments and/or one or more controllers. In the embodiment shown in FIG. 1, a general purpose computer 24 including a GPIB interface card (not shown) and acting as a system controller is coupled to the first GPIB bus 22. A printer device 26 is also shown coupled to the first GPIB bus 22. A GPIB extender 32A according to the present invention is also coupled to the first GPIB bus 22.

The GPIB extender 32A connects through a cable 40 to a second GPIB bus extender 32B according to the present invention. The cable 40 is preferably a serial data transmission cable, although other types of cabling or connectivity may be used. The GPIB extenders 32A and 32B are identical in the preferred embodiment. The second GPIB bus extender 32B connects to a second GPIB bus 42. Any of various devices may be coupled to the second GPIB bus 42 including one or more instruments and/or one or more controllers. In the embodiment shown in FIG. 1, a multimeter 44 and signal generator 46 are shown coupled to the second GPIB bus 42. The signal generator 46 and multimeter 44 interface to a unit under test 48 as shown.

Figure 2A:
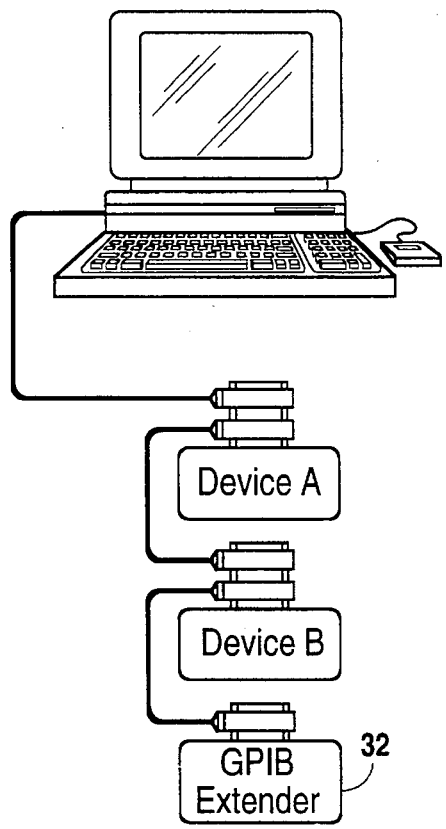
FIGS. 2A and 2B illustrate various configuration of GPIB systems.
Figure 2B:
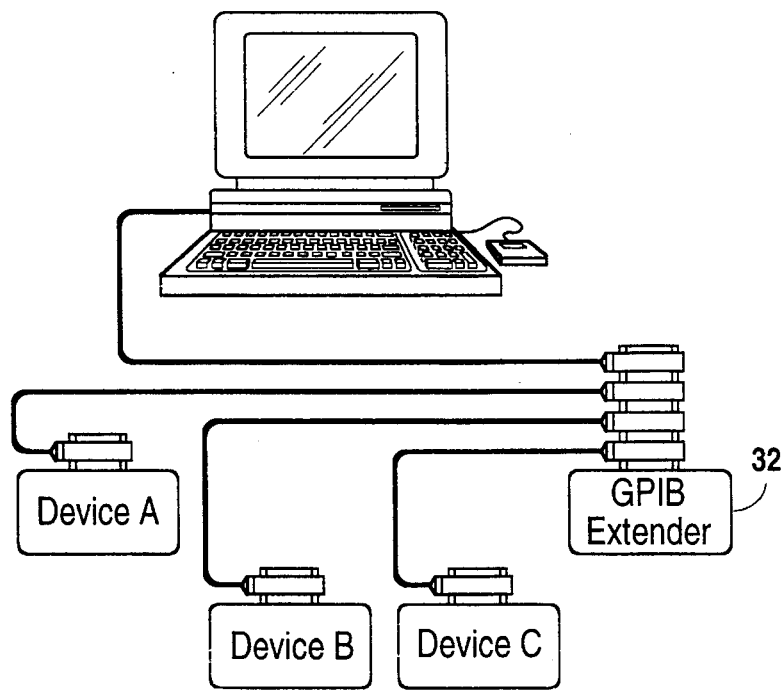

The GPIB system shown in FIG. 1 is illustrative only and it is noted that the GPIB bus extenders 32A and 32B of the present invention may be used in any of various types of GPIB systems. For example, the computer 24 and printer 26 connected via the first GPIB bus 22 may be connected in a linear configuration as shown in FIG. 2A or in a star configuration as shown in FIG. 2B. Likewise, the instruments 44 and 46 connected to the second GPIB bus 42 may be connected in either a linear or star configuration as desired. Also, the GPIB extenders 32A and 32B may be used with any of various types of GPIB instruments and controllers.

It is noted that the devices 26, 44 and 46 connected to the first and second GPIB buses 22 and 42 are either talker/listener devices, talk-only devices, or listen-only devices. In the preferred, embodiment, as shown, the multimeter 44 is configured as a talker/listener, and the printer 26 and signal generator 46 are both configured as listeners. In an alternate embodiment, the computer 24 and signal generator 46 are not included, and the multimeter is configured as a talk-only device, mad the printer is configured as a listen-only device. The GPIB extenders 32A and 32B of the present invention operate properly in either system and also support the IEEE 488.2 find listeners protocol.

Thus, in the preferred embodiment, if the controller 24 addresses a talker device on the second GPIB bus 42 to communicate with one or more listener devices on the first GPIB bus 22, the extenders 32A and 32B detect that the talker device is being addressed as a talker and configure themselves as listeners. The GPIB extender 32B configured as a listener receives data from the talker and transfers the data to the GPIB extender 32A. If the extenders 32A and 32B determine that a talker is not present on the bus, the extenders 32A and 32B do not configure themselves as listeners, but rather are available to transmit received messages to implement the 488.2 find listeners protocol.

GPIB Extender

Figure 3:
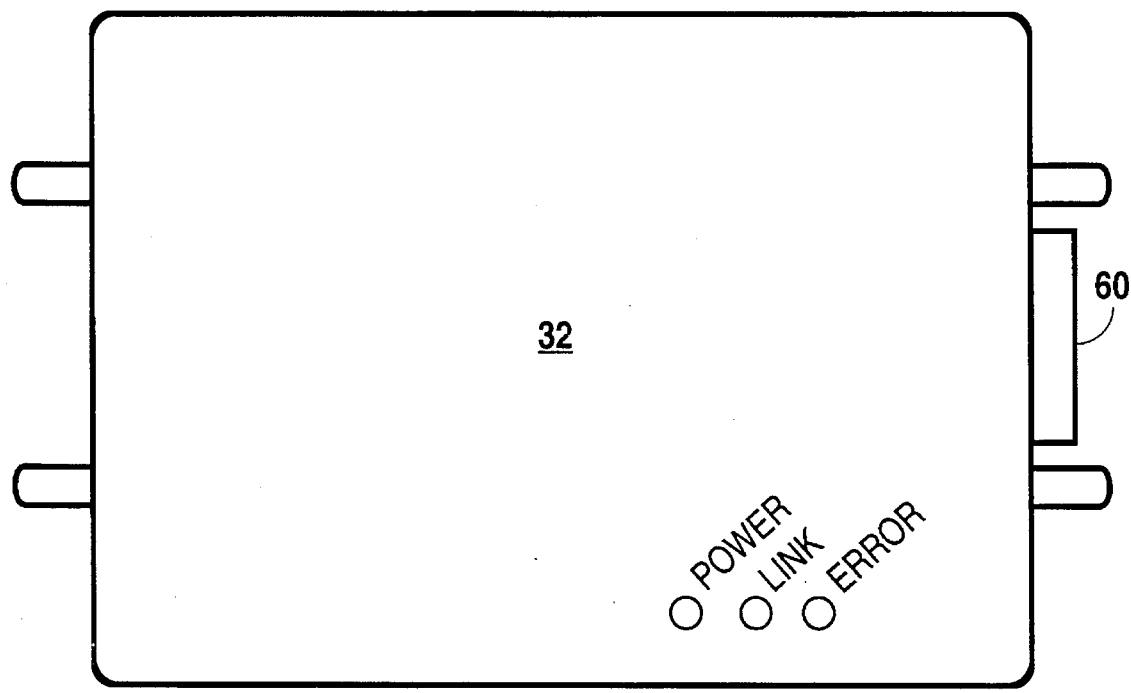
FIG. 3 illustrates a GPIB extender according to the present invention.

Referring now to FIG. 3, a diagram illustrating a GPIB extender 32 according to the preferred embodiment of the present invention is shown. As noted above, the GPIB extenders 32A and 32B are preferably identical, and thus only a single GPIB extender 32 is described below for convenience. As shown, the GPIB extender 32 includes a GPIB bus connector 60 for connecting to a GPIB cable, i.e., a local GPIB bus, as shown in either FIGS. 2A or 2B. The GPIB extender 32 also includes transmit and receive fiber optic connectors 62 for connecting to respective fiber optic cables which in turn couple to a remote GPIB extender on a remote GPIB bus. As shown, the GPIB extender 32 includes status lights for power, link and error. The power LED is lit when power is applied to the extender 32 and the extender 32 is on. The link LED is lit when both extenders 32A and 32B in a system are powered and the transmission cable is properly connected between the extenders 32A and 32B. The error LED is lit when the extender 32 receives corrupted data.

GPIB Extender Block Diagram

Figure 4:
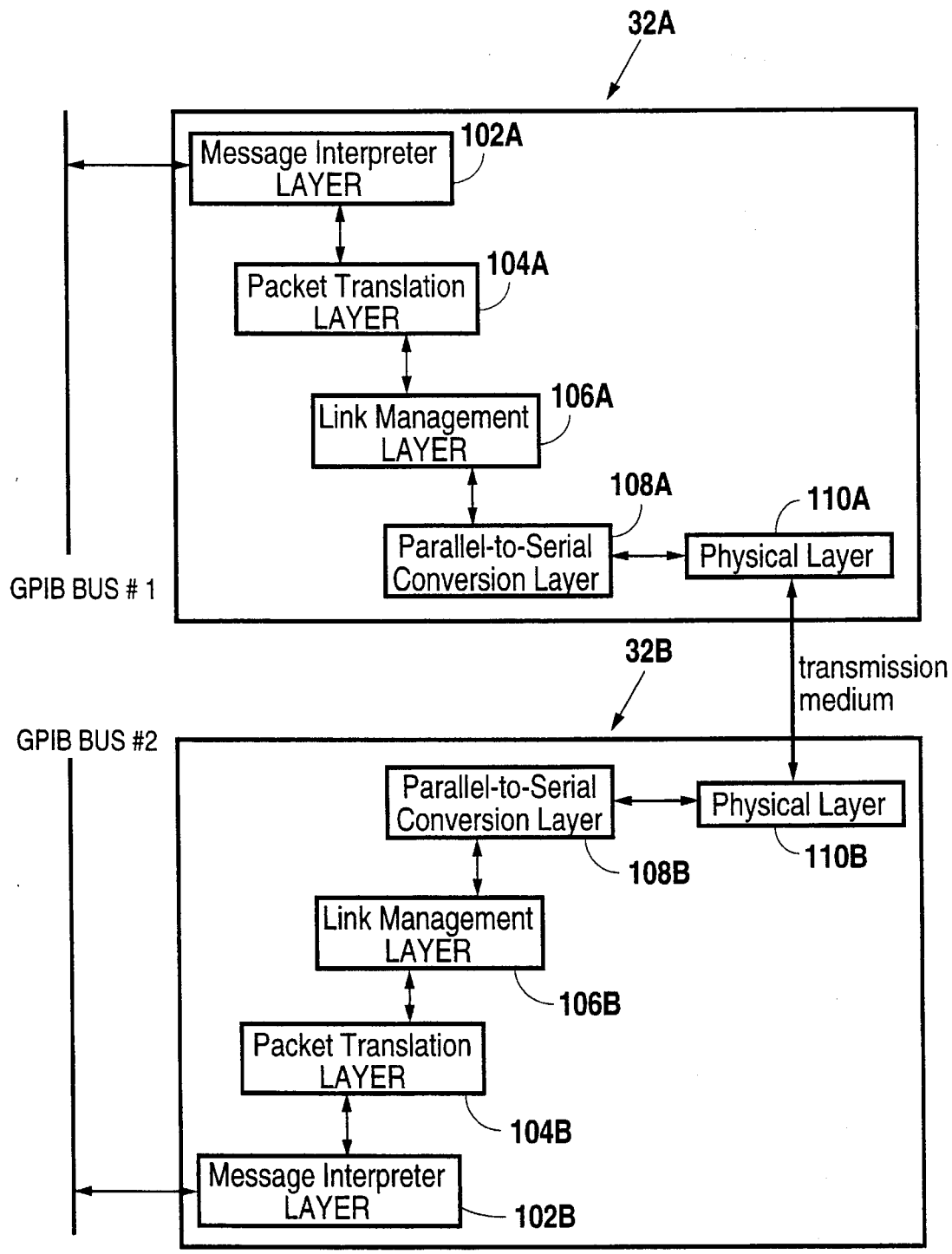
FIG. 4 is a more detailed block diagram of the GPIB bus extenders shown in FIG. 1.

Referring now to FIG. 4, a more detailed block diagram of the GPIB bus extenders 32A and 32B is shown. As with FIG. 3 above, only a single GPIB extender 32 is described. As shown, the GPIB extender 32 includes a message interpreter layer 102 which couples to the respective GPIB bus to which the GPIB extender 32 is connected, referred to here as the local GPIB bus. The message interpreter layer 102 performs the handshaking functions between the extender 32 and other devices on the local GPIB bus. The message interpreter layer 102 also monitors activities occurring on the bus and translates them into equivalent GPIB local and remote messages and these messages are then provided to packet translation layer 104. The message interpreter layer 102 also receives messages and data from the packet translation layer 104 which were generated by a remote extender. The message interpreter layer 102 also includes logic according to the present invention for implementing the IEEE 488.2 find listeners protocol on the GPIB bus. As described further below, the message interpreter layer 102 in the GPIB extender 32 monitors activity on the bus and configures itself as a listener when a talker is active on the bus. If a talker is not detected, then the extender 32 does not configure itself as a listener since a find listeners protocol is possible.

As noted above, the message interpreter layer 102 transmits and receives messages to and from the packet translation layer 104. The packet translation layer 104 converts messages received from the message interpreter layer 102 into packets and provides these to a link management layer 106. The packet translation layer 104 also receives packets from the link management layer 106 and converts them back to either local or remote GPIB messages before transmitting these messages to the message interpreter layer 102.

The link management layer 106 receives packets from the packet translation layer 104 and provides these packets to a parallel to serial conversion layer 108. The link management layer 106 also stores received packets from the packet translation layer 104 in a local buffer (not shown). If a transmission error occurs, the link management layer 106 re-sends the packets from this local buffer. The link management layer 106 also receives packets from the parallel to serial conversion layer 108 and examines these packets for transmission errors. If no error is detected, the packets are provided to the packet translation layer 104. If a transmission error is detected, the link management error 106 initiates a re-transmission request protocol.

The parallel to serial conversion layer 108 accepts packets from the link management layer 106, converts them into serial data, and provides the serial data to a physical layer 110. The parallel to serial conversion layer 108 also extracts serial bits from the physical layer 110, reconstructs them into a packet, and presents them to the link management layer 106.

The physical layer 110 handles the transmission and reception of serial data over the transmission link. As noted above, in the preferred embodiment, the transmission medium between two GPIB extenders 32A and 32B is preferably a serial data fiber optic link. However, other types of transmission mediums may also be used as desired.

Message Interpreter Layer Block Diagram

Figure 5:
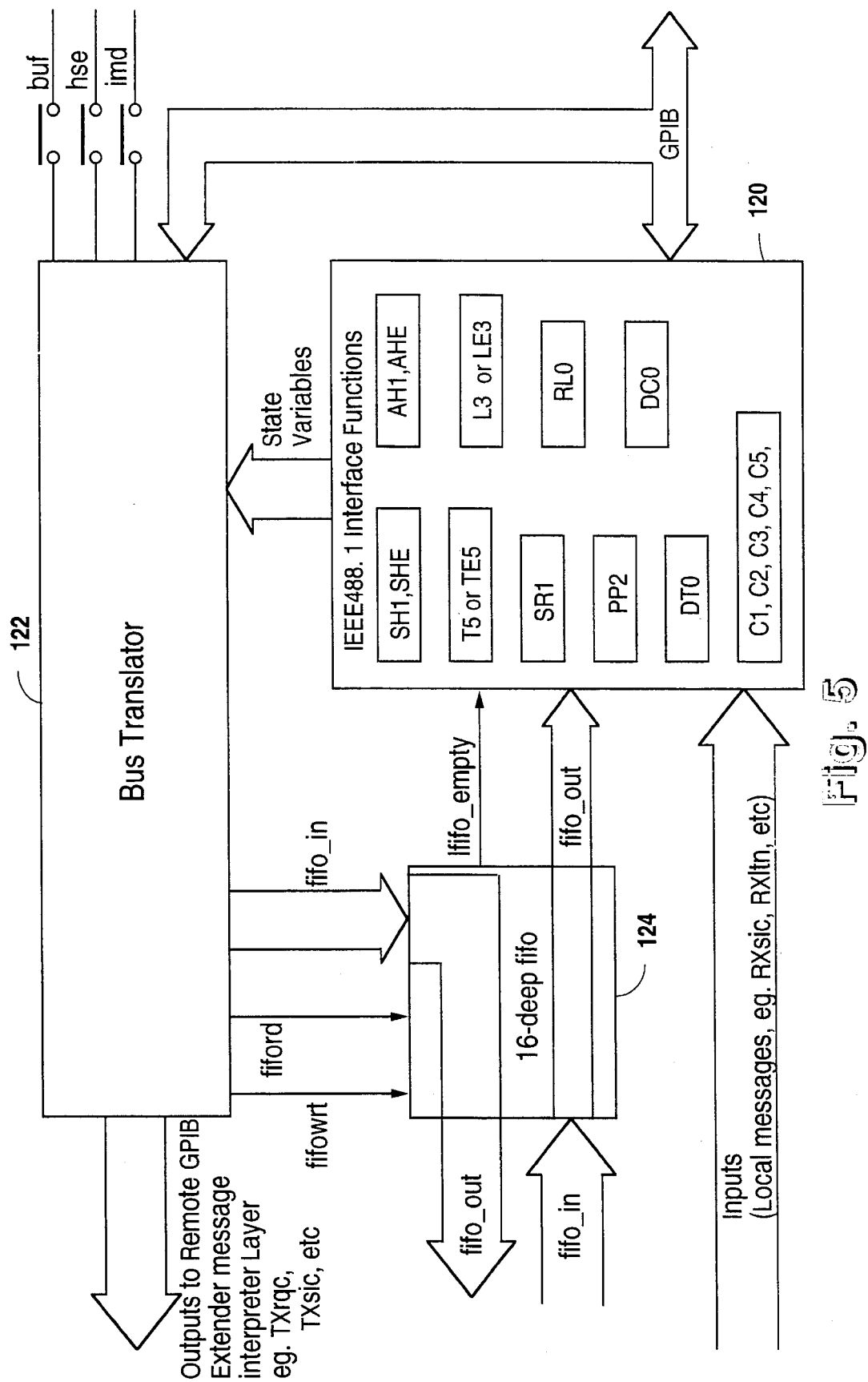
FIG. 5 is a block diagram of the message interpreter layer in one of the GPIB extenders of FIG. 4.

Referring now to FIG. 5, a block diagram illustrating the GPIB extender message interpreter layer 102 is shown. As shown, the message interpreter layer 102 includes an IEEE 488 interface function block 120 which connects to the respective local GPIB bus. The IEEE 488 interface function block 120 includes various state machine logic circuitry which implements the GPIB interface to the GPIB bus, i.e., this block enables the extender 32 to behave like one or more GPIB devices. The IEEE 488 interface function block 120 receives inputs comprising GPIB local messages from its respective packet translation layer 104, which were generated by a corresponding message interpreter layer in a remote GPIB extender 32. The IEEE 488 interface function block 120 includes logic for perforating high speed IEEE 488 transfers according to the present invention.

The message interpreter layer 102 also includes a bus translator 122 which also connects to the respective GPIB bus as shown. The IEEE 488 interface function block 120 provides various state variables to the bus translator 122. The bus translator 122 monitors activities on the local GPIB bus and uses the state variables from the IEEE 488 interface function block 120 in translating these activities into local messages for its corresponding remote GPIB extender, i.e., a remote IEEE 488 interface functions block 102 in the remote GPIB extender. These local messages are provided to the respective GPIB extender's packet translation layer 104, link management layer 106, etc. provided through the transmission medium, i.e., fiber optic link 40, and then provided through the respective layers in the remote GPIB extender to the message interpreter layer in the remote GPIB extender.

The bus translator 122 provides data received from the GPIB bus, referred to as fifo_in, to a 16-byte deep FIFO 124 as shown. This data is provided as data out to the remote GPIB extender. The bus translator 122 also provides FIFO write and FIFO read signals referred to as fifowrt and fiford, respectively, to the FIFO 124. The FIFO 124 receives data from the remote GPIB extender, also referred to as fifo_in, and this data is provided as fifo_out data to the IEEE 488 interface function block 120 as shown. The FIFO 124 also provides a lfifo_empty signal to the IEEE 488 interface block 120. The lfifo_empty signal indicates when asserted that the FIFO 124 is empty.

The bus translator 122 is coupled to three switches which determine operations of the message interpreter layer 102. The buf switch determines if buffered mode is used or not used during a data transfer. In buffered mode where buf equal one, acceptor handshaking logic (AH1, AHE) in the IEEE 488 interface function block 120 launches data into the FIFO 124 without checking for an acknowledge from the remote extender. In unbuffered mode where buf equals zero, the acceptor handshaking logic holds off the handshake until the acceptor receives an acknowledge. The hse switch determines if HS488 mode is enabled. The hse switch is set to one to enable HS488 mode and is set to zero to disable this mode. The imd switch determines if an immediate (imd=1) or stored (ired=0) parallel poll is used.

Therefore, the message interpreter layer 102 in the GPIB extender 32 monitors the GPIB bus and sends and receives data and messages to and from a remote message interpreter layer in a remote GPIB extender 32. The IEEE 488 interface function block 120 monitors activity on the GPIB bus and provides state variables to the bus translator 122. The IEEE 488 interface functions block 120 also receives local messages from the remote GPIB extender. The bus translator 122 also monitors activity on the GPIB bus and outputs messages to its counterpart remote GPIB extender. The bus translator 122 provides data from the GPIB bus to the FIFO 124 which is then output to the remote extender. The FIFO 124 also receives remote data from the respective remote extender and provides this data directly to the IEEE 488 interface functions block 120, which in turn provides the data to the GPIB bus.

As discussed above, the IEEE 488 interface functions block 120 implements the GPIB interface and enables the extender 32 to behave like one or more GPIB devices. The IEEE 488 interface functions block 120 comprises logic circuitry which implements ten individual interface functions. These functions are listed in the following table:

| Interface Function | Symbol | Descriptions |
| --- | --- | --- |
| Source Handshake | SH1, SHE | Complete Source Handshake Capability |
| Acceptor Handshake | AH1, AHE | Complete Acceptor Handshake Capability |
| Talker | T5/TE5 | Complete Talker Capability |
| Listener | L3/LE3 | Complete Listener Capability |
| Service Request | SR1 | Complete Service Request Capability |
| Remote Local | RL0 | Disabled Note: the REN message, MLA, GTL, and LLO command are still accepted and transferred to the remote side |
| Parallel Poll | PP2 | Complete Parallel Poll Capability |
| Device Clear | DC0 | Disabled Note: the DCL and SDC commands are still accepted and transferred to the remote side |
| Device Trigger | DT0 | Disabled Note: the GET command is still accepted and transmitted |
| Controller | C1, C2, C3, C4, C5 | Complete Controller Capability |

The Source Handshake function (SH1, SHE) 142 and the Acceptor Handshake function (AH1, AHE) 144 provide source and acceptor handshake capabilities, respectively.

The Source Handshake state machine 142 is used when "sourcing" messages or data to the bus 104. "Sourcing" means that data is being sent from the extender to another device coupled to the respective local GPIB bus. The Acceptor Handshake state machine 144 is used when accepting (i.e., receiving) multiline messages from a device on the respective local GPIB bus.

The Talker function block (T5/TE5) 146 and Listener function block (L3/LE3) 148 provide complete talker and listener capabilities, respectively. The Talker state machine 146 controls the transmission of device specific data messages to devices on the respective GPIB bus. The Talker function block 146 generates a state value referred to as TACS when the talker function 146 is active, meaning that the GPIB extender 32 is operating in a data transmission mode. The Talker state machine also generates the TACS state when the associated device is in a status reporting mode of operation. The Listener state machine 148 controls the reception of device specific data messages from devices on the respective GPIB bus. The Talker and Listener state machines also support the 488.2 find listeners protocol according to the present invention.

The Service Request (SR1) state machine 150 asserts the signal SRQ on the GPIB bus to request services from the active bus controller. The parallel poll (PP2) state machine provides parallel poll functions.

The Controller state machine 160 determines when the Source Handshake State Machine 142 is used to send interface messages (e.g., trigger, clear, and addressing messages) to devices on the GPIB 104. The Controller state machine 160 also handles service requests by devices on the GPIB 104. The Controller state machine 160 generates a State value of CACS (controller active state) when the bus controller is sending, or about to send, commands to the other devices on the GPIB. The state machine 160 also generates a state value of CTRS (controller transfer state) when it is transferring control to another device on the GPIB and is thus in the process of becoming idle.

The remote local (RL0) state machine, the device clear (DC0) state machine, and the device trigger (DT0) state machine are preferably disabled.

The state machines shown in FIG. 5 are interconnected by internal buses and signals lines (not shown) so that each state machine can use signals from the others. In the preferred embodiment, the state machines 142–160 of the extender 32 are implemented using electronic (e.g., gate array) circuits that shift from state to state in accordance with predefined logic rules that specify combinations of signals, states and timing requirements that must be met in order for a state machine to shift from one state to another. The logic in the IEEE 488 interface function block 120 can also be implemented using other types of circuitry, including a microcontroller or processor which executes instructions out of a memory, among others.

GPIB Background

In order to more fully understand the operation of the present invention, background on the GPIB bus specification is deemed appropriate. GPIB devices communicate with each other by sending device dependent messages and interface messages to each other. Device dependent messages, often called data or data messages, contain device specific information, such as programming instructions, measurement results, machine status, and data files. Interface messages are used for bus management and are usually referred to as commands or command messages. Interface messages perform such functions as initializing the bus, addressing and unaddressing devices, and setting device modes for remote or local programming.

GPIB devices can be talkers, listeners, and/or controllers. A talker sends data messages to one or more listeners which receive the data. The controller manages the flow of information on the GPIB bus by sending commands to all devices. The role of the GPIB controller is similar to the role of the computer's CPU. The controller monitors the GPIB bus, and when the controller determines that a first device wants to send a data message to a second device, the controller connects the first device, referred to as a talker, to the second receiver device, referred to as a listener. The controller usually addresses or enables a talker and a listener before the talker can send its message to the listener. After the message is transmitted, the controller may address other talkers and listeners. It is noted that some GPIB configurations do not require a controller. For example, a device that is always a talker, referred to as a talk only device, may be connected to one or more listen only devices without the need of a controller. A controller is necessary when the active or addressed talker or listener must be changed to a new active talker or listener.

GPIB Bus Signals

The GPIB bus interface comprises 16 signal lines and 8 ground-return or shield-drain lines. The 16 signal lines, which are discussed below, are grouped into eight data lines, three handshake lines, and five interface management lines. The GPIB bus uses a negative logic system which specifies a zero logic level on any line which is true. In the Figures and in the description below, the symbol "!" means a logical NOT, the symbol "+" means a logical OR, and the symbol "&" means a logical AND. For convenience, the GPIB signal lines are often referred to herein without including the "!" at the beginning of the signal name.

The following convention is used with regard to symbols written using uppercase and lowercase letters: bus lines (e.g. DAV for data valid and ATN for attention) on the GPIB bus and the names of states in the interface's various state machines are denoted with upper case letters, while local messages generated and used only internally to the interface (e.g., "nba" for new byte available, and "pon" for power on) are denoted with lowercase letters.

1. Data Lines

DIO 1–8. The GPIB bus includes an 8 bit data bus comprising lines DIO 1–8.

2. Handshake Lines

Three handshake lines asynchronously control the transfer of message bytes between devices, this process being referred to as a three-wire interlocked handshake. The three-wire interlocked handshake guarantees that message bytes on the data lines are sent and received without transmission error.

NRFD. The NRFD (not ready for data) signal indicates when a device is ready or not ready to receive a message byte. The line is driven by all devices when receiving commands, by listeners when receiving data messages, and by the talker when enabling the HS488 protocol. The NRFD line is asserted low to temporarily prevent the assertion of new data on the bus, more specifically to prevent the assertion of the DAV (data valid) signal.

NDAC. The NDAC (not data accepted) signal indicates when a device has or has not accepted a message byte. The line is driven low by all devices when receiving commands, and by listeners when receiving data messages. The NDAC line is asserted low when the device receiving a byte of a message has not accepted the byte. When several devices are reading a broadcast message, DAC becomes true only when the slowest device has accepted delivery of the byte.

DAV. The DAV (data valid) signal is asserted low when the signals on the data lines are stable (valid) and can be accepted safely by devices, i.e., when a byte of data has been asserted on the bus. The controller drives DAV when sending commands, and the talker drives DAV when sending data messages.

The NRFD and NDAC signal lines on the GPIB are open collector type signal lines that are terminated with pull-up resistors. When no device is asserting or driving NRFD or NDAC, that line carries a high signal because it is pulled high by its pull up resistor(s). Thus, a device either pulls down or releases these signal lines in order to assert low and high signals on the bus. In some instances, such as when there is more than one acceptor device receiving data, several devices may initially pull down the NRFD line and then release that signal line to indicate completion of a particular task. When all the acceptor devices release the NRFD or NDAC signal lines, the signal line rises to a high signal level which is then detected by the controller or other sourcing device.

3. Interface Management Lines

The five interface management lines manage the flow of information across the interface. The five interface management lines comprise the ATN (attention) line, the IFC (interface clear) line, the REN (remote enable) line, the SRQ (service request) line, and the EOI (end or identify) line.

ATN. The attention (ATN) signal differentiates between commands and data messages. The controller drives the ATN signal true when it uses the data lines to send commands, and drives ATN false when a talker can send data messages. Thus the controller asserts the ATN line low before "addressing" one or more of the devices on the IEEE 488 bus. When ATN is asserted, a device address is asserted on the data bus. ATN is also false during multiline data transfers.

IFC. The system controller drives the IFC line to initialize the bus to a standby or idle state. The IFC line is asserted low to reset a number of device interface functions (i.e., state machines in the interface).

REN. The system controller drives the REN line, which is used to place devices in remote or local program mode. The REN line is used by the controller to instruct devices on the IEEE 488 bus to begin responding to commands from the controller.

SRQ. A device drives the SRQ line to asychronously request service from the controller.

EOI. The EOI line has two purposes—the talker uses the EOI line to mark the end of a message string, and the controller uses the EOI line to tell devices to identify their response in a parallel poll.

Internally to the state machines of the interface, a number of internal signals are used that reverse the logic convention of the GPIB signals, while others preserve the logic convention of the GPIB signals. In particular, the DAC (data accepted) message is true when the NDAC signal line is low, and RFD (ready for data) is true when the NRFD signal line is low. DAV (data valid) is true when DAV is low, and ATN is true when ATN is low.

Normal and HS488 Transfers

The DAV, NRFD, and NDAC signal lines operate in either a three-wire (interlocked) handshake, sometimes referred to as a normal transfer, or a high speed, non-interlocked handshake process (HS488 data transfer) to transfer each data byte across the interface.

During normal speed multiline data transfers, the sequence of events for transmission of data is as follows. Prior to the data transmission, the controller sends command messages to the transmitting device (also called the "sourcing" device) and the receiving devices (also called the acceptors or the accepting devices) instructing them as to their respective roles during the next data transfer. Then the controller deasserts ATN, which signals the sourcing device that it can begin data transmission. For each byte of data to be sent, the source device first asserts a data value on the DIO1–8 lines. After the data value on the DIO1–8 is stable, the sourcing device must hold the signals on the data lines steady for a specified settling period before asserting the data valid signal DAV.

Prior to the time that the sourcing device asserts data values on the DIO1–8 lines, each of the accepting devices asserts NRFD, indicating that it is not ready to receive data, until it is ready to receive the next byte of data. Since any single device can pull the NRFD line low, it is only when all the accepting devices are ready to receive data that the NRFD line goes high. The sourcing device must wait until the NRFD line goes high before asserting the data valid signal DAV. After the data valid signal DAV is asserted, the first acceptor device to notice the assertion of DAV seats the NRFD line low to indicate that it is no longer ready, and then accepts the transmitted data, at which point it releases the data accepted line NDAC.

The NDAC line is held low by the accepting devices until they have all successfully latched in the transmitted byte of data. Since any single accepting device can pull the NDAC line low, it is only when all the accepting devices have accepted the transmitted data that the NDAC line goes high. When the sourcing device detects that the NDAC line has gone high, it then releases the data valid line DAV and begins the next data byte transmission cycle by asserting new data values on the DIO1–8 lines.

HS488 transfers change the multiline data transmission sequence as follows. Normally, after all the acceptor devices have released the not ready for data line NRFD, the NRFD line is allowed to stay high until the sourcing device asserts a data valid signal on the DAV line. However, if the sourcing device is "high speed capable," it sends a "single line message," herein called the "high speed message," to all the acceptor devices by pulling the NRFD line low before asserting data valid. This special message is recognized by acceptor devices that are "high speed capable," and is ignored by any acceptor devices that are not high speed capable.

During transmission of the first byte of data, each acceptor device that is high speed capable and that received the "high speed message" from the source device refrains from pulling the NRFD line low. After the assertion of DAV, as during nonhal multiline data transmissions, all acceptor devices release the NDAC line after accepting the first byte of data. If any acceptor device is not high speed capable, it will operate normally and therefore it will pull the NRFD line low when it receives the data valid signal DAV.

If none of the acceptor devices pulls the NRFD line low after DAV is asserted, that means that all the acceptor devices are high speed capable. The sourcing device monitors the NRFD line to determine whether it is pulled low, and if none of the acceptor devices pulls the NRFD line low, subsequent byes of the data transfer are transmitted using the high speed data transfer method. In particular, the sourcing device releases the data valid line DAV, letting it go high, while new data values are asserted on the DIO1–8 lines and for a specified settling time, and then pulls the data valid line DAV low for a predefined interval during which the acceptor devices must read the transmitted byte of data. The timing intervals for asserting data and for asserting data valid are preset by the sourcing device, and do not depend on acknowledgment signals from the acceptor devices. During transmission of all the bytes after the first byte, the acceptor devices leave the NRFD and NDAC lines in a high state.

Generally, acceptor devices have input buffers from which the received data is read and processed. If any acceptor's input buffer is on the verge of overflowing, its interface can stop the high speed data transfer mode by pulling the !NDAC line low. Because of the maximum allowed length (20 meters) and the maximum allowed capacitive loading of the GPIB, plus the maximum speed at which high speed transfers can take place, it is possible for up to two or three bytes of data to be in the midst of transmission at any one time. To provide some additional safety margin, each acceptor device includes Data In Monitoring circuitry for detecting when its Data In Buffer is not ready to accept at least four bytes of additional data then deasserting its internal local "ryf" (ready for four bytes) message, which in turn causes the interface's Acceptor Handshake state machine 144 to assert a low signal on the !NDAC line.

When the sourcing device detects that the !NDAC line has been pulled low in the midst of a high speed data transfer, it interrupts data transmission until such time that none of the acceptor devices asserts a low signal on the !NDAC line, at which point the sourcing device continues to source data using high speed data transmission mode. Any acceptor device can leave high speed mode by using the "lhs" (leave high speed) local message and asserting the !NDAC line, in which case the sourcing device can continue to transmit data using the normal interlocked handshake mode until ATN asserts and deasserts again or until the "lhs" local message becomes false.

T5/TE5 Talker Interface Function

Referring now to FIG. 6, the Talker interface function is shown which provides a device with the complete capability to send device dependent data over the interface to other devices. The only local message used by the T5 interface function is RXnba. The Talker function does not distinguish between status bytes and regular data bytes.

Figure 6A:
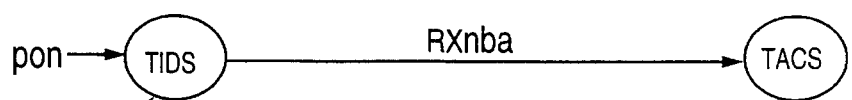
FIGS. 6A and 6B, illustrates a state machine for circuitry in the message interpreter layer which performs talker functions according to the present invention.
Figure 6B:
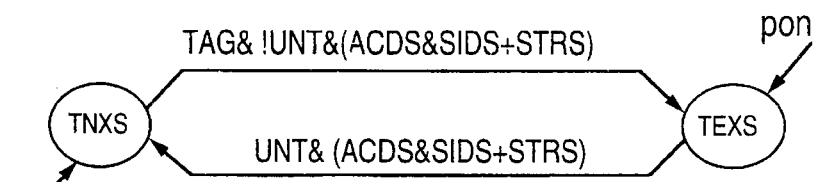

As shown in FIG. 6, two state machines shown in FIGS. 6A and 6B are shown which enable the extender 32 to behave as a talker. The state machine shown in FIG. 6B includes two additional states used by the Talker interface function, referred to as the Talker EXist State (TEXS) and the Talker NoneXist State (TNXS). These two states do not have a direct effect on the GPIB signals, but are used to implement the Find Listener Protocol in the GPIB extender 32 according to the present invention.

As shown in FIG. 6A, at power on the state machine begins operations in a state referred to as the Talker Idle State (TIDS). The state machine also enters the TIDS state when the condition:

IFC+err +ATN is true. The equation for the err signal is:

err=t1 & RFD & DAC & SDYS

Thus the state machine enters the TIDS state when the interface clear line is asserted, which resets a number of interface function state machines, or the err condition is true, or ATN is asserted. The ATN signal is preferably deglitched.

The state machine advances from the TIDS state to a state referred to as the Talker Active State (TACS) state when the local message Rxnba is true, indicating that the extender 32 has received a new byte from the remote extender. The extender 32 only behaves as a talker when a talker device on the remote GPIB bus is attempting to transmit data to a listener on the extender's local GPIB bus. In this instance, the talker on the remote bus transmits the data, the remote extender receives the data and provides the data to the local extender 32, and the local extender behaves as a talker on the local bus to source the data to the one or more respective listeners on the local bus.

Referring now to FIG. 6B, a state machine referred to as the TEXS state machine is shown which implements the 488.2 find listener's protocol. The TEXS state machine attempts to determine if any device in the system (on either side of the extension) is an addressed talker. On power on (pon), the state machine enters the TEXS state. Here the state machine presumes there is a talker present in the system at power on. In this manner, the TEXS state machine begins operation in the proper state if there is a talk only (ton) device present in the system, or if a device is addressed to talk before the extender is turned on.

The state machine transitions from the TEXS state to a state referred to as the TNXS state if the extender 32 determines that there are no active talkers in the system, signified by the condition:

UNT & (ACDS & SIDS+STRS)

being true. Thus the state machine transitions from the TEXS state to the Talker Non-Exist state (TNXS) state if the GPIB message Untalk is true and the extender 32 is either a listener, signified by the ACDS & SIDS condition being true, or is a controller-in-charge (CIC) sending the Untalk message, signified by the LINT and STRS condition being true. The GPIB message Untalk configures all talker to not be listeners. The equation for the LINT message is:

UNT='1' when DIO[7:1]=B"1011111" and ATN='1' else '0'.

The state machine also enters the TNXS state when the IFC signal line is asserted.

The state machine transitions from the TNXS state to the TEXS state if the extender 32 determines that there is an active talker in the system, signified by the condition:

TAG & !UNT & (ACDS & SIDS+STRS)

being true. This condition is true when the controller is sending a talker address message to a talker on the bus, meaning that a talker will be present on the bus after the current handshaking completes. The equation for the TAG condition is:

TAG='1' when DIO7='1' and DIO6='0' and ATN='1' else '0'.

L3/LE3 Listener Interface Function

Figure 7:
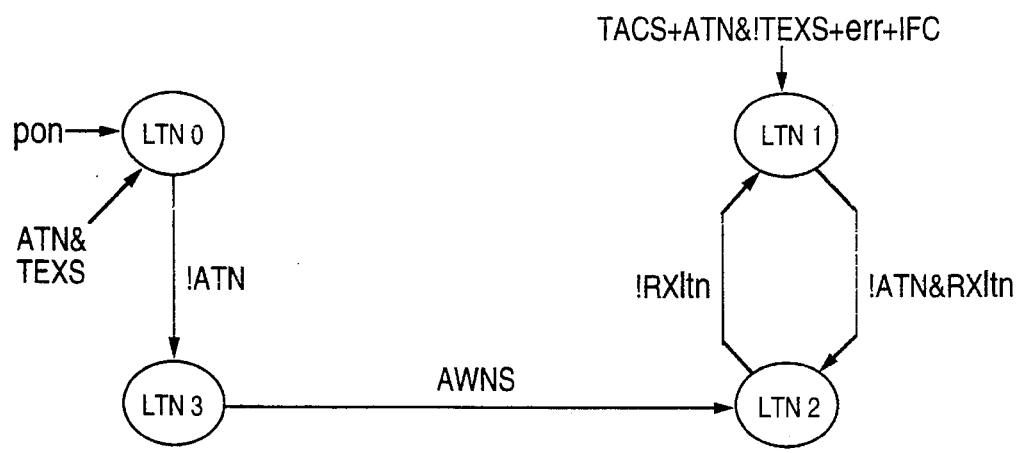
FIG. 7 illustrates a state machine for circuitry in the message interpreter layer which performs listener functions according to the present invention.

Referring now to FIG. 7, the L3 listener interface function is shown which provides a device with the complete capability to receive device dependent data over the interface from other devices. The Listener function also uses the TEXS state from the Talker state machine described above and configures the extender 32 as a listener when a talker is active on the bus. When no talkers are determined to be active on the bus, the Listener function does not configure the extender as a listener due to a possible find listeners protocol. It is noted that during the find listeners protocol, an extender which receives a response to the protocol from a remote listener behaves as a listener to model the listener on the remote bus responding to the protocol.

The listener interface function generates the local message ltn, which indicates whether the extender 32 is configured as a listener. The extender 32 remains in a state referred to as the Listener Idle State (LIDS) when ltn is false, i.e., when the extender 32 is not configured as a listener. The extender 32 enters a state referred to as the Listener ACtive State (LACS) only when the local message ltn is true. The equations for the LIDS state and the LACS state are as follows:

LIDS=not ltn

LACS=ltn

As shown in FIG. 7, at power-up the Listener function begins in a state referred to as LTN0. The state machine also enters the LTN0 state when the condition:

ATN & TEXS is true, i.e., when ATN is asserted and a talker exists in the system. The state machine advances from the LTN0 state to a state referred to as LTN3 when !ATN is true, i.e., when ATN is negated. The state machine advances from the LTN3 state to a state referred to as LTN2 when a condition referred to as AWNS is true. The AWiMS condition is a state in the Acceptor Handshake state machine which indicates that the extender 32 is waiting for a new cycle.

The Listener function transitions from the LTN2 state to a state referred to as LTN1 when the local message RXtln is false, i.e., when !Rxltn is true. The ltn message is negated in state LTN1. The local message RXltn is the TXltn message received from the remote extender 32 which indicates whether a listener exists on the remote side. Thus, if no listener exists on the remote side, and since the current transfer on the local side has completed, no listener exists in the system, and thus ltn is false. It is noted that the TXltn message generated by an extender 32 is false when the controller-in-charge (CIC) is on the local side to the extender 32 and a talker is not present. Thus the RXltn message received from a remote extender may be false even if a listener exists on the remote side if the controller-in-charge is also situated on the remote side. Thus, when a listener situated on the same side as the controller responds to a find listener protocol, the ltn message is not broadcast by the extender to the other side.

The Listener function also enters the LTN1 state when the condition:

TACS+ATN & !TEXS+err+IFC is true, indicating that a controller is currently active and that a talker is not currently active. The state machine transitions from the LTN1 state to the LTN2 state when the condition:

!ATN & Rxltn is true, i.e., a listener exists on the remote side.

The equation for the ltn message is:

LACS=ltn=LTN0+LTN2+LTN3

Thus, when the extender 32 detects that a talker exists in the GPIB system, i.e., when the extender 32 detects a talker address message from a controller to a talker device, the ltn local message becomes true. After completion of the first byte of the transfer, the state machine enters the LTN2 state, and the extender checks the RXltn signal to determine if there is a listener at the remote side. If not, the state machine advances to LTN1 and the status of the local message ltn is changed accordingly. If there is no talker in the system, Itn is only asserted when RXltn becomes true.

Therefore, the extender 32 only sends the ltn message to the side where the controller is located. For example, if the controller is situated on the remote side and a remote listener, i.e., a listener on the same bus as the controller, responds to the find listener protocol, then even though the extender detects the listener on the remote bus, the remote extender does not transmit and/or assert the ltn message to the local extender since the remote extender knows that the controller is situated on the remote bus. However, if the controller is situated on the local bus, then the remote extender transmits the TXltn message asserted to the local extender to inform the local controller that a listener exists on the remote bus.

Thus, during a find listener protocol, listeners on the same side as the controller-in-charge respond directly to the controller, and these responses are not transmitted to the remote side. Responses by listeners on the remote side to the extender are transmitted from the remote extender to the local extender and then to the controller.

Txltn State Machine—Bus Translator

Figure 8:
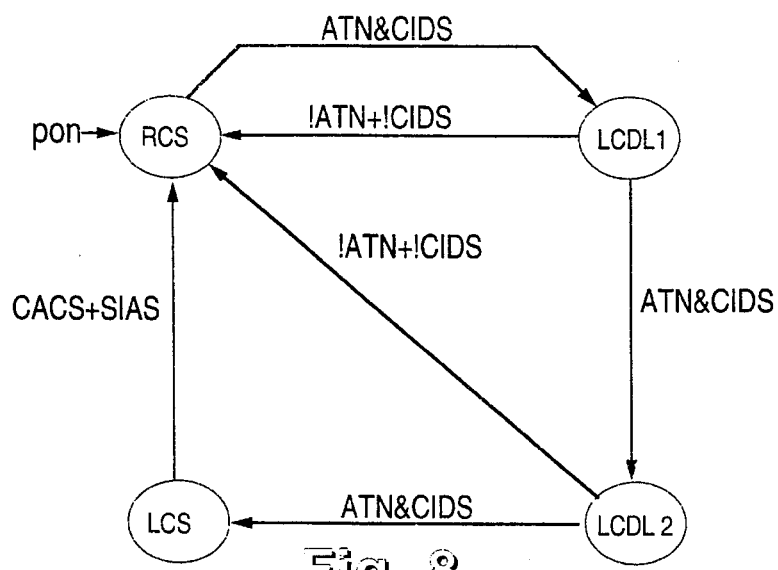
FIG. 8 illustrates a state machine for circuitry in the bus translator in the message interpreter layer of FIG. 5 which generates a listener message.

Referring now to FIG. 8, TXltn state logic in the bus translator 122 is shown which generates the TXltn message. The TXltn message indicates that a listener exists on the local side. The TXltn message is an input to the Packet Translation Layer. On the remote side, RXltn received from a remote extender is used by the LTN state machine in the Listener function as described above.

As shown in FIG. 8, the state machine powers on in a state referred to as RCS. The state machine is clocked at 5 Mhz. The state machine advances to a state referred to as LCDL 1 when the condition:

ATN & CIDS is true, indicating that the controller is on the local bus. The state machine transitions from the LCDL1 state to a state referred to as LCDL2 on the next clock cycle when the condition:

ATN & CIDS remains true. The LCDL2 state also indicates that the controller is on the local bus relative to the extender. The LCDL1 and LCDL2 states provide a delay in the state machine. The state machine transitions from the LCDL2 state to a state referred to as LCS on the next clock cycle when the condition:

ATN & CIDS remains true. The LCS state indicates that the controller is on the local bus. The state machine returns from either the LCDL 1 state or the LCDL2 state to the RCS state when the condition:

!ATN & !CIDS is true. The state machine transitions from the LCS state to the RCS state when the condition:

CACS+SIAS is true, indicating that the controller is on the remote bus.

A signal referred to as TXltn is generated by the state machine as follows:

TXltn=(NRFD+NDAC+STRS) & !pon & (RCS+TEXS)

Thus the TXltn signal is asserted when a listener exists on the local side. The TXltn signal is also preferably deglitched.

The TXltn message is false when the controller-in-charge (CIC) is on the local side and there is no talker. This prevents oscillation of the ltn signal when there is a listener at the remote side and the local controller is performing the Find Listener Protocol.

IEEE 488 Interface Function Logic

The remaining GPIB interface function logic circuitry in the IEEE 488 interface functions block 120 includes the Source Handshake and Acceptor Handshake function logic, the Parallel Poll function logic, and the Controller function logic. Since the operation of this logic is generally well know in the art and is deemed unnecessary for an understanding of the present invention, the details of operation of this circuitry are omitted for simplicity.

BUS TRANSLATOR

Overview

The bus translator function block 122 monitors all the activities of the local GPIB bus and translates them into local messages for the remote IEEE 488.1 Interface functions block in the remote extender. The inputs for this block comprise all GPIB signals and state variables from its corresponding IEEE 488.1 Interface functions block. Since the operation of this logic is generally well known in the art and is deemed unnecessary for an understanding of the present invention, the details of operation of this circuitry are omitted for simplicity.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing a find listeners protocol in an IEEE 488 instrumentation system including a first IEEE 488 bus, one or more devices coupled to the first IEEE 488 bus including one or more listener devices, a first bus extender coupled to the first IEEE 488 bus, a second IEEE 488 bus, one or more devices coupled to the second IEEE 488 bus including one or more listener devices, and a second bus extender coupled to the second IEEE 488 bus and also coupled to the first bus extender, wherein at least one of the devices in the system has the capability of being a controller, the method comprising:

the first bus extender determining that a talker is not currently active in the IEEE 488 instrumentation system;

the second bus extender determining that a talker is not currently active in the IEEE 488 instrumentation system;

the first bus extender not behaving as a listener in response to the first extender determining that a talker is not currently active in the IEEE 488 instrumentation system;

the second bus extender not behaving as a listener in response to the second extender determining that a talker is not currently active in the IEEE 488 instrumentation system; and the controller performing a find listeners protocol in the IEEE 488 instrumentation system to determine addresses of the one or more devices coupled to the first IEEE 488 bus and the one or more devices coupled to the second IEEE 488 bus, wherein the first and second bus extenders do not behave as listeners during at least a portion of said step of performing the find listeners protocol.

2. The method of claim 1, wherein the controller is coupled to the first IEEE 488 bus, the method further comprising:

the one or more listeners coupled to the second IEEE 488 bus responding to the find listeners protocol, wherein the one or more listeners coupled to the second IEEE 488 bus generate find listeners protocol responses;

the second bus extender receiving said find listeners protocol responses from the one or more listeners coupled to the second IEEE 488 bus;

the second bus extender providing said find listeners protocol responses from the one or more listeners coupled to the second IEEE 488 bus to the first bus extender; and the first bus extender providing said find listeners protocol responses received from the second bus extender to the controller coupled to the first IEEE 488 bus.

3. The method of claim 2, further comprising:

the second bus extender determining that the controller performing said find listeners protocol is coupled to the first IEEE 488 bus prior to said step of the second bus extender providing said find listeners protocol responses;

wherein the second bus extender provides said find listeners protocol responses to the first bus extender in response to the second bus extender determining that the controller performing said find listeners protocol is coupled to the first IEEE 488 bus.

4. The method of claim 2, the method further comprising:

the one or more listeners coupled to the first IEEE 488 bus responding to the find listeners protocol, wherein the one or more listeners coupled to the first IEEE 488 bus generate find listeners protocol responses;

the controller coupled to the first IEEE 488 bus receiving said find listener protocol responses from the one or more listeners coupled to the first IEEE 488 bus;

the first bus extender receiving said find listeners protocol responses from the one or more listeners coupled to the first IEEE 488 bus;

wherein the first bus extender does not provide said find listeners protocol responses from the one or more listeners coupled to the first IEEE 488 bus to the second bus extender.

5. The method of claim 4, further comprising:

the first bus extender determining that the controller performing said find listeners protocol is coupled to the first IEEE 488 bus prior to said step of the first bus extender receiving said find listeners protocol responses;

wherein the first bus extender does not provide said find listener protocol responses to the second bus extender in response to the first bus extender determining that the controller performing said find listeners protocol is coupled to the first IEEE 488 bus.

6. The method of claim 1, further comprising:

providing power to the IEEE 488 instrumentation system;

the first extender behaving as a listener in response to said step of providing power to the IEEE 488 instrumentation system;

the second extender behaving as a listener in response to said step of providing power to the IEEE 488 instrumentation system.

7. The method of claim 1, wherein at least one of the one or more devices coupled to either the first IEEE 488 bus or the second IEEE 488 bus includes talker capabilities, the method further comprising:

the controller addressing a device to configure the device as a talker and to direct the device to begin a data transfer in the IEEE 488 instrumentation system;

the first extender detecting the controller addressing the device to configure the device as a talker;

the second extender detecting the controller addressing the device to configure the device as a talker;

the first extender behaving as a listener in response to the first extender detecting the controller addressing the device to configure the device as a talker;

the second extender behaving as a listener in response to the second extender detecting the controller addressing the device to configure the device as a talker; and the talker device transferring the data to one or more listeners in the IEEE 488 instrumentation system.

8. The method of claim 7, wherein the talker device is coupled to the first IEEE 488 bus, wherein said step of the talker transferring the data comprises:

the talker device on the first IEEE 488 bus beginning a data transfer targeted to at least one listener device on the second IEEE 488 bus;

the first bus extender receiving said data on the first IEEE 488 bus;

the first bus extender transmitting said data to the second bus extender;

the second bus extender receiving said data from the first bus extender; and the second bus extender providing the data to the at least one listener device on the second IEEE 488 bus.

9. The method of claim 1, wherein said at least a portion of said step of performing the find listeners protocol comprises a beginning portion, wherein the first and second bus extenders do not behave as listeners during said beginning portion of said step of performing the find listeners protocol, the method further comprising:

a listener device coupled to the second IEEE 488 bus responding to the find listeners protocol;

the second bus extender receiving the response to the find listeners protocol from the listener device equaled to the second IEEE 488 bus;

the second bus extender transferring the response to the find listener protocol to the first bus extender; and the first bus extender behaving as a listener to model the listener device coupled to the second IEEE 488 bus responding to the find listeners protocol, wherein the first bus extender behaving as a listener occurs after said transferring the response to the find listeners protocol to the first bus extender.

10. The method of claim 9, wherein said beginning portion of said step of performing the find listeners protocol includes a period at least until one of the one or more devices coupled to the first and second IEEE 488 buses respond to the find listeners protocol.

11. A method of operating a bus extender in an IEEE 488 instrumentation system including a first IEEE 488 bus, one or more devices coupled to the first IEEE 488 bus including one or more listener devices, the bus extender coupled to the first IEEE 488 bus, a second IEEE 488 bus, one or more devices coupled to the second IEEE 488 bus including one or more listener devices, and a second bus extender coupled to the second IEEE 488 bus and also coupled to the bus extender, wherein at least one of the devices in the system has the capability of being a controller, the method comprising:

the bus extender determining that a talker is not currently active in the IEEE 488 instrumentation system;

the bus extender not behaving as a listener in response to the bus extender determining that a talker is not currently active in the IEEE 488 instrumentation system;

the controller performing a find listeners protocol in the IEEE 488 instrumentation system to determine addresses of the one or more devices coupled to the first IEEE 488 bus and addresses of the one or more devices coupled to the second IEEE 488 bus, wherein the bus extender does not behave as a listener during at least a portion of said step of performing the find listeners protocol.

12. The method of claim 11, wherein the controller is coupled to the second IEEE 488 bus, the method further comprising:

the one or more listeners coupled to the first IEEE 488 bus responding to the find listeners protocol, wherein the one or more listeners coupled to the first IEEE 488 bus generate find listeners protocol responses;

the bus extender receiving said find listeners protocol responses from the one or more listeners coupled to the first IEEE 488 bus;

the bus extender providing said find listeners protocol responses from the one or more listeners coupled to the first IEEE 488 bus to the second bus extender; and the second bus extender providing said find listeners protocol responses from the one or more listeners coupled to the first IEEE 488 bus to the controller coupled to the second IEEE 488 bus.

13. The method of claim 12, further comprising:

the bus extender determining that the controller performing said find listeners protocol is coupled to the second IEEE 488 bus prior to said step of the bus extender providing said find listeners protocol responses;

wherein the bus extender provides said find listeners protocol responses to the second bus extender in response to the bus extender determining that the controller performing said find listeners protocol is coupled to the second IEEE 488 bus.

14. The method of claim 11, wherein the controller is coupled to the first IEEE 488 bus, the method further comprising:

the one or more listeners coupled to the first IEEE 488 bus responding to the find listeners protocol, wherein said one or more listeners generate find listeners protocol responses;

the controller coupled to the first IEEE 488 bus receiving said find listeners protocol responses from the one or more listeners coupled to the first IEEE 488 bus;

the bus extender receiving said find listeners protocol responses from the one or more listeners coupled to the first IEEE 488 bus;

the bus extender not providing said find listeners protocol responses from the one or more listeners coupled to the first IEEE 488 bus to the second bus extender.

15. The method of claim 14, further comprising:

the bus extender determining that the controller performing said find listeners protocol is coupled to the first IEEE 488 bus prior to said step of the bus extender not providing said find listeners protocol responses;

wherein the bus extender does not provide said find listeners protocol responses to the second bus extender in response to the bus extender determining that the controller performing said find listeners protocol is coupled to the first IEEE 488 bus.

16. The method of claim 11, further comprising:

providing power to the IEEE 488 instrumentation system;

the bus extender behaving as a listener in response to said step of providing power to the IEEE 488 instrumentation system.

17. The method of claim 11, wherein at least one of the one or more devices coupled to either the first IEEE 488 bus or the second IEEE 488 bus comprises a talker device, the method further comprising:

the controller addressing the talker to direct the talker to begin a data transfer in the IEEE 488 instrumentation system;

the bus extender detecting the controller addressing the talker;

the bus extender behaving as a listener in response to the first extender detecting the controller addressing the talker; and the talker transferring data to one or more listeners in the IEEE 488 instrumentation system.

18. An IEEE 488 instrumentation system, comprising:

a first IEEE 488 bus;

one or more devices coupled to the first IEEE 488 bus, said one or more devices including one or more listener devices on the first IEEE 488 bus;

a first bus extender coupled to the first IEEE 488 bus which receives data and messages from the one or more devices coupled to the first IEEE 488 bus;

a second IEEE 488 bus;

one or more devices coupled to the second IEEE 488 bus, said one or more devices including one or more listener devices; and a second bus extender coupled to the second IEEE 488 bus and also coupled to the first bus extender which receives said data and messages from the first bus extender, wherein the second bus extender also receives data and messages from the one or more devices coupled to the second IEEE 488 bus and provides said data and messages to said first bus extender;

a controller coupled to said first IEEE 488 bus which performs a find listeners protocol to locate listeners on said first IEEE 488 bus and said second IEEE 488 bus;

wherein the one or more listeners coupled to the first IEEE 488 bus and the one or more listeners coupled to the second IEEE 488 bus provide responses to said controller in response to said find listeners protocol;

wherein the first bus extender includes means for determining whether a talker is currently active in the IEEE 488 instrumentation system, wherein the first bus extender does not behave as a listener when said means for determining determines that a talker is not currently active in the IEEE 488 instrumentation system;

wherein the second bus extender includes means for determining whether a talker is currently active in the IEEE 488 instrumentation system, wherein the second bus extender does not behave as a listener when said means for determining determines that a talker is not currently active in the IEEE 488 instrumentation system.

19. The instrumentation system of claim 18, wherein the one or more listeners coupled to the second IEEE 488 bus respond to the find listeners protocol performed by the controller, wherein the one or more listeners generate find listeners protocol responses;

wherein the second bus extender includes:

means for receiving said find listeners protocol responses from the one or more listeners coupled to the second IEEE 488 bus;

means for providing said find listeners protocol responses from the one or more listeners coupled to the second IEEE 488 bus to the first bus extender; and wherein the first bus extender includes:

means for providing said find listeners protocol responses received from the second bus extender to the controller coupled to the first IEEE 488 bus.

20. The instrumentation system of claim 19, wherein the second bus extender further includes:

means for determining whether the controller performing said find listeners protocol is coupled to the first IEEE 488 bus;

wherein said means for providing in the second bus extender provides said find listeners protocol responses to the first bus extender in response to said means for determining in the second bus extender determining that the controller performing said find listeners protocol is coupled to the first IEEE 488 bus.

21. The instrumentation system of claim 19, wherein the one or more listeners coupled to the first IEEE 488 bus respond to the find listeners protocol performed by the controller, wherein the one or more listeners generate find listeners protocol responses to the controller;

wherein the first bus extender comprises:

means for receiving said find listener protocol responses from the one or more listeners coupled to the first IEEE 488 bus;

wherein the first bus extender does not provide said find listener protocol responses from the one or more listeners coupled to the first IEEE 488 bus to the second bus extender.

22. The instrumentation system of claim 21, wherein the first bus extender further comprises:

means for determining whether the controller performing said find listeners protocol is coupled to the first IEEE 488 bus;

wherein the first bus extender does not provide said find listener protocol responses to the second bus extender in response to said means for determining in the first bus extender determining that the controller performing said find listeners protocol is coupled to the first IEEE 488 bus.

23. The instrumentation system of claim 18, further comprising:

wherein the first extender begins operations as a listener in response to the IEEE 488 instrumentation system receiving power;

wherein the second extender begins operations as a listener in response to the IEEE 488 instrumentation system receiving power.

24. The instrumentation system of claim 18, wherein at least one of the one or more devices coupled to either the first IEEE 488 bus or the second IEEE 488 bus comprises a talker device;

wherein the controller includes means for addressing the talker to direct the talker to begin a data transfer in the IEEE 488 instrumentation system;

wherein the first bus extender includes:

means for detecting the controller addressing the talker;

wherein the first bus extender behaves as a listener in response to said means for detecting in the first bus extender detecting the controller addressing the talker;

wherein the second bus extender includes:

means for detecting the controller addressing the talker;

wherein the second bus extender behaves as a listener in response to said means for detecting in the second bus extender detecting the controller addressing the talker.

25. An IEEE 488 bus extender which participates in a find listeners protocol in an instrumentation system, comprising:

an IEEE 488 connector for coupling to a first IEEE 488 bus;

a bus extender connector for connecting to a second bus extender;

means, coupled to said IEEE 488 connector and said bus extender connector, for receiving data and messages from devices coupled to the first IEEE 488 bus and providing said data and messages to the second bus extender coupled to a second IEEE 488 bus;

means, coupled to said IEEE 488 connector and said bus extender connector, for receiving data and messages from the second bus extender and providing said data and messages to devices coupled to the first IEEE 488 bus;

means for determining whether a talker is currently active in the instrumentation system, wherein the bus extender does not behave as a listener in response to said means for determining that a talker is not currently active in the instrumentation system.

26. The bus extender of claim 25, further comprising:

means, coupled to said IEEE 488 connector, for receiving find listener protocol responses from devices coupled to the first IEEE 488 bus; and means, coupled to said bus extender connector, for providing said find listener protocol responses to the second bus extender.

27. The bus extender of claim 26, further comprising:

means, coupled to said IEEE 488 connector, for determining whether a controller generating a find listeners protocol is coupled to the first IEEE 488 bus;

wherein said means for providing provides said find listeners protocol responses to the second bus extender in response to said means for determining that the controller generating the find listeners protocol is not coupled to the first IEEE 488 bus.

28. The bus extender of claim 25, further comprising:

means for receiving power, wherein the bus extender begins operations as a listener in response to receiving power.

29. The bus extender of claim 25, wherein the bus extender is adapted for operating in a first IEEE 488 instrumentation system comprising only one talk-only device and one or more listen-only devices, wherein said first IEEE 488 instrumentation system does not include a controller;

wherein the bus extender is also adapted for operating in a second IEEE 488 instrumentation system including an IEEE 488 controller, a plurality of talker devices and a plurality of listener devices.

30. An IEEE 488 bus extender which participates in a find listeners protocol in an instrumentation system comprising a first IEEE 488 bus and one or more devices coupled to the first IEEE 488 bus, said one or more devices including one or more listener devices, wherein the bus extender is coupled to the first IEEE 488 bus, the instrumentation system further comprising a second IEEE 488 bus, one or more devices coupled to the second IEEE 488 bus, said one or more devices including one or more listener devices, and a second bus extender coupled to the second IEEE 488 bus and also coupled to the bus extender, the bus extender comprising:

an IEEE 488 connector for coupling to the first IEEE 488 bus;

a bus extender connector for connecting to the second bus extender;

means, coupled to said IEEE 488 connector and said bus extender connector, for receiving data and messages from the one or more devices coupled to the first IEEE 488 bus and providing said data and messages to the second bus extender;

means, coupled to said IEEE 488 connector and said bus extender connector, for receiving data and messages from the second bus extender and providing said data and messages to the one or more devices coupled to the first IEEE 488 bus;

means, coupled to said IEEE 488 connector and said bus extender connector, for determining whether a talker is currently active in the IEEE 488 instrumentation system, wherein the bus extender does not behave as a listener in response to said means for determining that a talker is not currently active in the IEEE 488 instrumentation system.

31. The bus extender of claim 30, further comprising:

means for receiving find listener protocol responses from the one or more devices coupled to the first IEEE 488 bus; and means for providing said find listener protocol responses to the second bus extender.

32. The bus extender of claim 30, further comprising:

means for determining whether a controller generating a find listeners protocol is coupled to the first IEEE 488 bus;

wherein said means for providing provides said find listeners protocol responses to the second bus extender in response to said means for determining determining that the controller generating the find listeners protocol is coupled to the first IEEE 488 bus.

33. The bus extender of claim 30, wherein the bus extender is capable of operating in a first IEEE 488 instrumentation system comprising only one talk-only device and one or more listen-only devices, wherein said first IEEE 488 instrumentation system does not include a controller;

wherein the bus extender is also capable of operating without modification in a second IEEE 488 instrumentation system including an IEEE 488 controller, a plurality of talker devices and a plurality of listener devices.

\* \* \* \* \*

UNITED STATES PATENT AND TRADEMARK OFFICE
CERTIFICATE OF CORRECTION

PATENT NO. : 5,572,525

DATED : November 5, 1996

INVENTOR(S) : Shen et al.

It is certified that error appears in the above-indentified patent and that said Letters Patent is hereby corrected as shown below:

Claim 9, col. 19, line 54, please delete "equaled" and substitute therefor -- coupled --.

Claim 9, col. 19, line 57, please delete "listener" and substitute therefor -- listeners --.

Signed and Sealed this

Eighth Day of April, 1997

Attest:

BRUCE LEHMAN

Attesting Officer

Commissioner of Patents and Trademarks